J. P. DUVAL.
PLANT PROTECTOR.
APPLICATION FILED SEPT. 14, 1908.
914,708.
Patented Mar. 9, 1909.
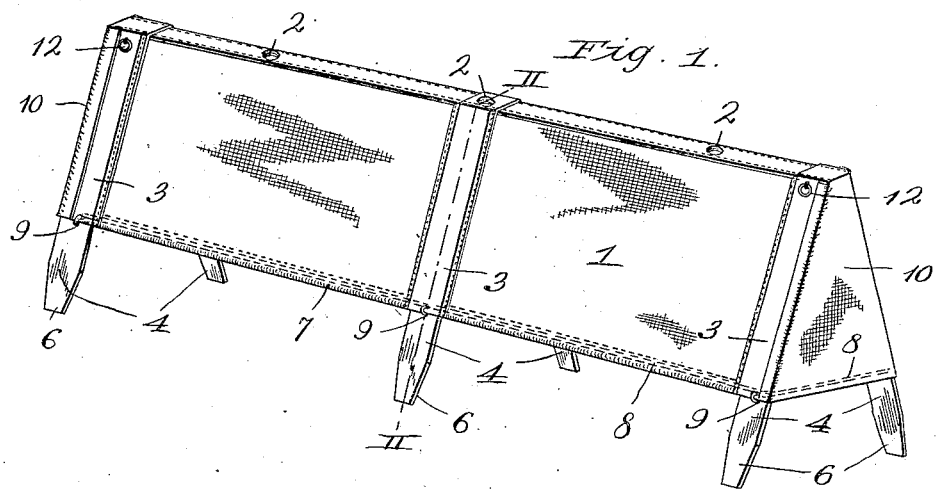
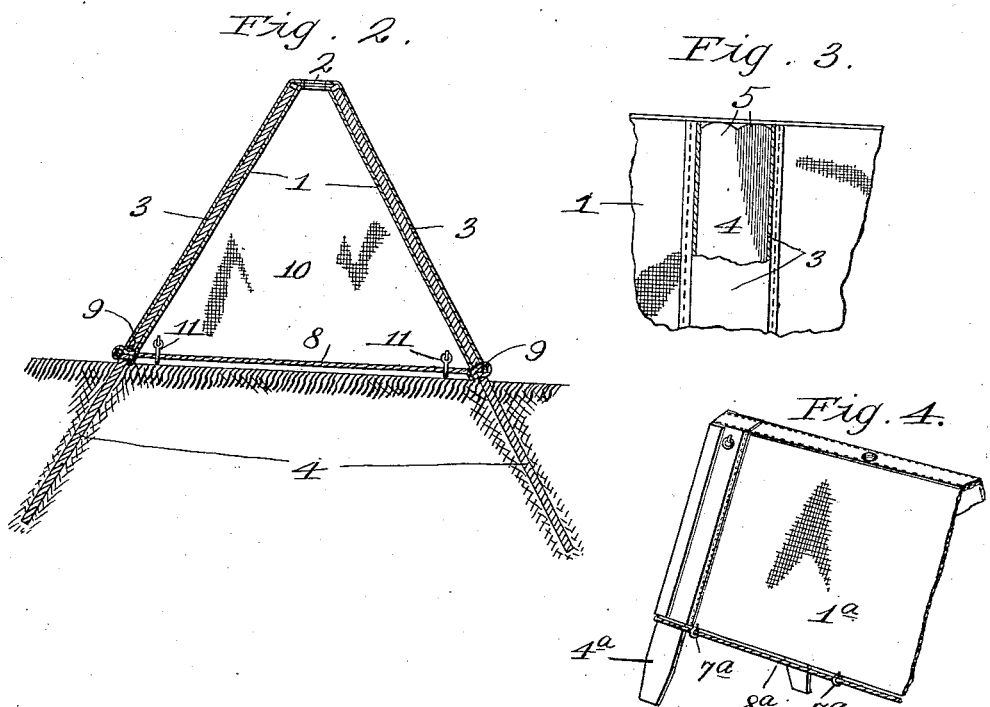
WITNESSES:
R. E. Hamilton
M. Cox
INVENTOR.
J. P. Duval,
BY F. G. Fischer,
ATTORNEY.

UNITED STATES PATENT OFFICE.

JENNIE P. DUVAL, OF KANSAS CITY, MISSOURI.

PLANT-PROTECTOR.

No. 914,708.  Specification of Letters Patent.  Patented March 9, 1909.

Application filed September 14, 1908. Serial No. 453,041.

*To all whom it may concern:*

Be it known that I, JENNIE P. DUVAL, a citizen of the United States, residing at Kansas City, in the county of Jackson and State of Missouri, have invented certain new and useful Improvements in Plant-Protectors, of which the following is a specification.

My invention relates to improvements in plant protectors, and my object is to provide a simple and inexpensive device of this character whereby gardeners may protect rows of plants from injury by frost and hail.

The device is so arranged that it may be quickly set up for use or taken down, it also provides for thorough ventilation so that the plants will not be injured by a rising temperature.

With these and other objects in view the invention consists in the construction, combination and arrangement of parts hereinafter described, illustrated in the accompanying drawing, and pointed out in the claims, it being understood that various changes in form, proportions, and minor details of construction may be resorted to without departing from the spirit or scope of the invention.

In order that the invention may be thoroughly understood, reference will now be made to the accompanying drawing, in which:

Figure 1 represents a perspective view of the device set up ready for use. Fig. 2 is a cross section of the same on line II—II of Fig. 1. Fig. 3 is a broken side elevation of the device. Fig. 4 is a broken perspective view of a modified form of the device.

In carrying out the invention, I employ a flexible elongated covering 1, which is preferably of inverted V-shaped form when set up ready for use. Said covering is provided with air-holes 2 at its upper portion to allow ventilation so that the plants, beneath the covering, will not be injured by a rising temperature. Said covering is also provided at its opposite sides with equally-spaced pockets 3 for the reception of suitable supports 4, which are removably arranged therein, so that should one of said supports become broken, it may be readily replaced with a new one.

The upper ends 5 of the supports are rounded to prevent tearing the upper ends of the pockets, while their lower ends 6 are reduced in size so they may be easily forced into the ground and thus reliably support the covering in position over the plants. The lower side edges of the covering are provided with hems 7 through which a cable 8 extends for the purpose of reinforcing said lower edge and holding the same close to the ground so that cold air cannot readily pass beneath the same and enter the device. Said cable also secures supports 4 in the pockets 3, it passing through openings 9 in the supports for that purpose.

10 designates flaps at the ends of the covering to prevent the entrance of cold air beneath the same. Said flaps are provided at their lower ends with hooks 11, adapted to engage the transverse portions of cable 8 and thus prevent the flaps from being blown upward by the wind.

When the temperature is sufficiently high to warrant the admission of air beneath the covering, one or both of the flaps may be thrown upward and supported by securing the hooks to rings 12 provided at the ends of the covering for that purpose. When not in use the device may be rolled up in compact form for storage.

The modified form disclosed by Fig. 4, is constructed substantially in the same manner as the preferred form, except that the lower edges of the covering 1$^a$ are provided with rings 7$^a$, through which the cable 8$^a$ is rove.

Having thus described my invention, what I claim is:—

1. A device of the character described consisting of an elongated covering having pockets in the sides thereof, supports for said covering fitting into the pockets, a cable secured to the lower portion of the covering, flaps secured to the ends of the covering, and fastening devices at the lower edges of the flaps for engaging the cable.

2. A device of the character described consisting of an elongated covering having pockets in the sides thereof, supports for said covering fitting into the pockets, a cable secured to the lower portion of the covering, flaps secured to the ends of the covering, fastening devices at the lower edges of the flaps for engaging the cable, and rings at the upper end portions of the covering adapted to be engaged by the fastening devices on the flaps for supporting the latter in a raised position.

In testimony whereof I affix my signature, in the presence of two witnesses.

JENNIE P. DUVAL.

Witnesses:
   F. G. FISCHER,
   M. COX.